(12) United States Patent
Serret

(10) Patent No.: US 7,171,987 B2
(45) Date of Patent: Feb. 6, 2007

(54) PIPE FITTING PLUG

(76) Inventor: Raymond J. Serret, 660 Bradford Rd., Pleasantville, NY (US) 10570

( * ) Notice: Subject to any disclaimer, the term of this patent is extended or adjusted under 35 U.S.C. 154(b) by 429 days.

(21) Appl. No.: 10/734,471

(22) Filed: Dec. 12, 2003

(65) Prior Publication Data

US 2004/0168734 A1    Sep. 2, 2004

Related U.S. Application Data

(60) Provisional application No. 60/433,334, filed on Dec. 13, 2002.

(51) Int. Cl.
*F16L 55/10* (2006.01)
(52) U.S. Cl. .......................... 138/89; 138/90
(58) Field of Classification Search .................. 138/89, 138/90
See application file for complete search history.

(56) References Cited

U.S. PATENT DOCUMENTS

| | | | | |
|---|---|---|---|---|
| 411,978 A * | 10/1889 | Chisholm | ..................... | 138/94 |
| 646,804 A * | 4/1900 | Clark | ........................... | 138/98 |
| 2,375,995 A * | 5/1945 | Kaeser | ........................ | 220/236 |
| 2,475,748 A * | 7/1949 | Leroy | ........................... | 138/90 |
| 2,824,577 A * | 2/1958 | Grunsky | ....................... | 138/90 |
| 3,886,977 A * | 6/1975 | Dorgebray | ................... | 138/89 |
| 4,381,800 A * | 5/1983 | Leslie | ........................... | 138/90 |
| 4,474,216 A * | 10/1984 | Noe | ................................ | 138/89 |
| 4,493,344 A * | 1/1985 | Mathison et al. | ............. | 138/89 |
| 4,760,868 A * | 8/1988 | Saxon | ......................... | 138/89 |
| 4,817,671 A * | 4/1989 | Mathison et al. | ............. | 138/89 |
| 5,636,662 A * | 6/1997 | Olson | ........................... | 138/89 |

\* cited by examiner

*Primary Examiner*—James Hook
(74) *Attorney, Agent, or Firm*—Lucas & Mercanti

(57) ABSTRACT

A reusable pipe fitting plug for temporarily sealing the open hub on a non-threaded female pipe fitting. The pipe fitting plug has a retainer with piercing edges, expandable pins or grit type particles designed to engage the inner portion of a pipe fitting hub in order to anchor the pipe fitting plug. The pipe fitting plug further has an expandable rubber seal or expandable rubber bladder designed to provide a watertight seal.

11 Claims, 7 Drawing Sheets

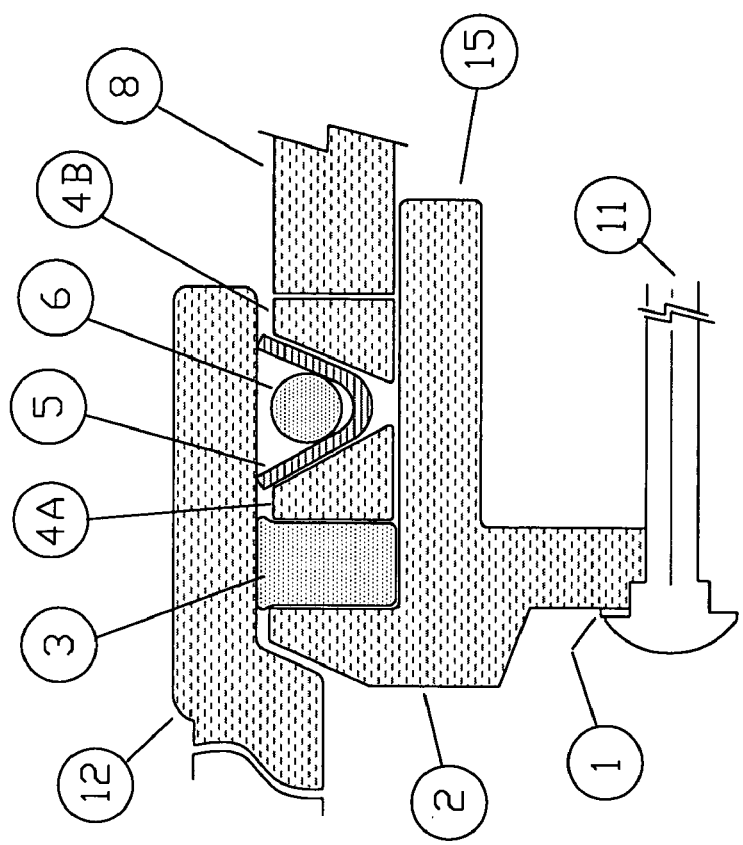
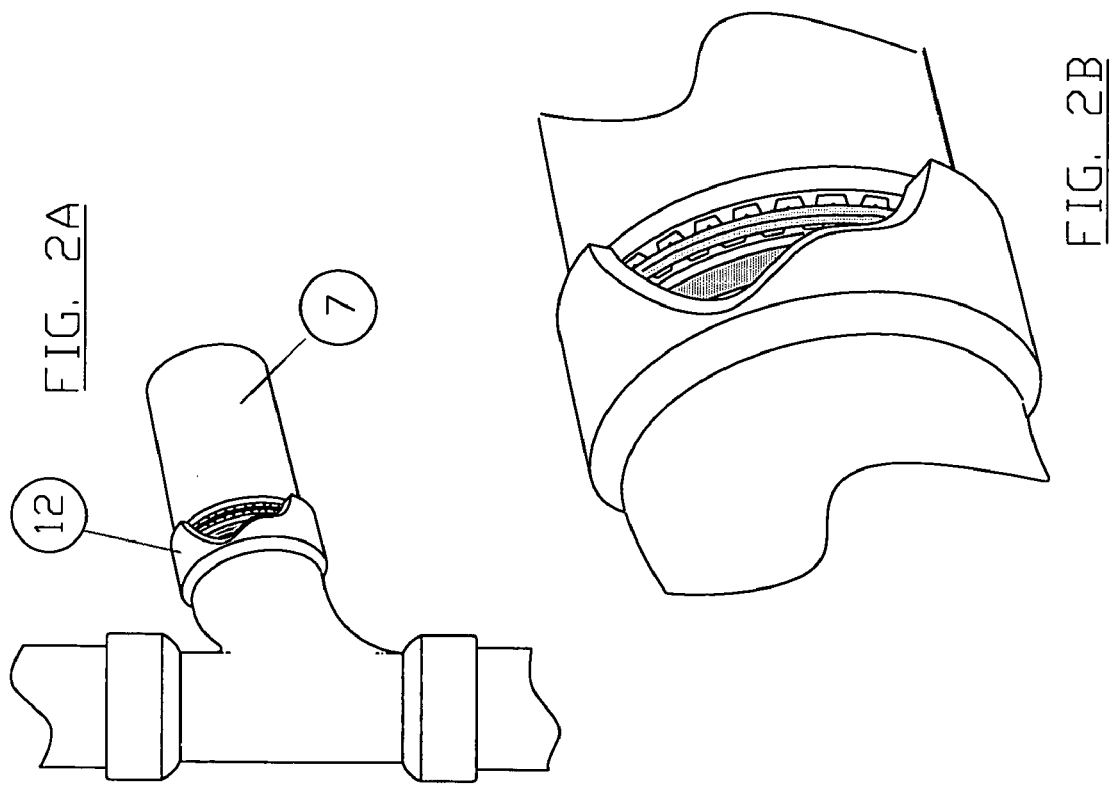

PIPE FITTING PLUG

CROSS REFERENCE TO RELATED APPLICATIONS

This Application claims the priority of Provisional Application Ser. No. 60/433,334, filed Dec. 13, 2002.

BACKGROUND OF THE INVENTION

1. Field of the Invention

This invention relates to reusable pipe fitting plugs for temporarily sealing an open hub of a non-threaded female pipe fitting.

2. Art Relating to the Invention

Reusable pipe fitting plugs provide an inexpensive means to control the unwanted release of fluids or air from an open pipe connection. Reusable pipe fitting plugs can also be used to isolate various sections of a pipe system during construction or maintenance.

Conventional reusable pipe fitting plugs are designed with an expandable rubber sealing means that is capable of forming a watertight seal between the pipe fitting plug and the inner surface of the pipe fitting hub.

In a typical design, the pipe fitting plug is shaped as a cylinder with a diameter of slightly less than the diameter of the pipe fitting hub that is desired to be plugged. The pipe fitting plug therefore covers the majority of the diameter of the inside of the pipe fitting hub. The expandable rubber sealing means is provided along the circumference of the pipe fitting plug and is capable of filling the gap between the outside of the pipe fitting plug and the inside of the pipe fitting hub. Fluid flow is restricted upon the plugging of the gap with the rubber sealing means.

Conventional pipe fitting plugs have a rubber sealing element located within a recess of the cylinder. A tightening means is designed to exert a force through the body of the pipe fitting plug so as to decrease the recess and expand the rubber sealing element. The rubber sealing element expands under the pressure exerted by the tightening means to form a watertight seal between the pipe fitting plug and the pipe fitting hub.

One of the drawbacks of conventional pipe fitting plugs is that they can only withstand a limited fluid pressure. When the fluid pressure against the pipe fitting plug passes a threshold value, the rubber sealing element can no longer hold the pipe fitting plug in place and the pipe fitting plug is forced out of the pipe fitting hub. This is known as plug blow out, and results in uncontrolled flooding and damage.

Further, debris, dirt and solvent may be deposited within the inner surface of the pipe fitting hub causing slippage between the rubber sealing element and the pipe fitting hub resulting in further undesired consequences.

It is therefore desirable to obtain a reusable pipe fitting plug that is capable of withstanding increased fluid pressures and soiled surfaces without becoming disengaged from the pipe fitting hub and causing flooding.

SUMMARY OF THE INVENTION

The present invention provides a reusable pipe fitting plug for temporarily sealing the open fitting connections of a plumbing system during construction or maintenance which can withstand increased fluid pressure and avoid plug blow out.

The present invention provides maximum seal and hold out strength by the use of a pipe fitting plug having a dedicated seal and a dedicated retaining means.

The seal is a conventional, expandable rubber ring or inflatable bladder which provides a watertight seal between the pipe fitting plug and the inner wall of the pipe fitting hub.

The retaining means is also expandable and provides a means to anchor the pipe fitting plug into the pipe fitting hub. The retaining means enables the pipe fitting plug to withstand increased fluid pressure without failure. The retaining means further prevents slippage caused by debris, dirt and solvent buildup on the inside of the pipe fitting hub.

Broadly, the present invention is a pipe fitting plug comprising:

a body which is watertight;

an expandable sealing means surrounding said body for forming a watertight seal between said body and an interior surface of a pipe fitting hub;

an expandable retaining means for engaging said interior surface of said pipe fitting hub and retaining said plug in said pipe fitting hub; and one or more adjusting means for causing said sealing means and said retaining means to engage and disengage said interior surface of said pipe fitting hub.

Preferably, the sealing means is an expandable rubber ring which expands to form a watertight seal between the body and the interior surface of the pipe fitting hub. The sealing means can alternatively be in the form of an expandable rubber bladder that inflates to form a watertight seal. The sealing means forms a watertight seal with the pipe fitting hub to prevent fluid from moving through or around the plug because the body itself is solid, i.e., watertight/fluidtight and the seal is watertight/fluidtight thereby blocking the whole interior area of the pipe fitting hub.

Preferably, the retaining means has a one or more piercing edges or projecting teeth which are movable to engage the interior surface of the pipe fitting and retain the plug in the pipe fitting hub. Alternatively, the retaining means can have one or more expandable pins which are movable to engage the interior surface of the pipe fitting hub and retain the plug in the pipe fitting hub. The retaining means can further have a plurality of grit type particles which serve to retain the plug in the pipe fitting hub. The retaining means provides the increased strength to the plug to allow the plug to withstand increased fluid pressure.

The retaining means and the sealing means are both movable so as to engage and disengage the interior surface of the pipe fitting hub. This allows the plug to be inserted into the pipe fitting hub, to seal and be retained in the pipe fitting hub, and to be removed from the pipe fitting hub.

Preferably, there is a single adjusting means which operates on both the retaining means and the sealing means such that both the retaining means and the sealing means expand and retract simultaneously. However, the retaining means and the sealing means can each have their own adjusting means.

According to one embodiment of the present invention, the adjusting means is composed of an end piece affixed to one end of the body, a housing that slides on the other end of the body, and a controlling force means that extends from the body through the housing, preferably along the axis of the housing. The controlling force means can be a carriage bolt with a threaded fastener or the like. The threaded fastener compresses the housing and the end piece and causes the sealing means and the retaining means to expand and contract.

According to another embodiment of the present invention, the adjusting means is composed of an inner chamber within the body, an air valve in communication with the inner chamber and one or more air ports in communication with the sealing means and the inner chamber. The air valve increases the air pressure within the inner chamber and the sealing means through the air ports causing the sealing means and the retaining means to expand.

Preferably, the retaining means and the sealing means are located within a recess of the body of the pipe fitting plug. The recess is created between an end piece of the body and a housing which surrounds the body of the pipe fitting plug. The end piece is fixed to the body while the housing moves on the body of the plug. As a result, the adjusting means can cause the housing to move along the body to or from the end piece in order to expand or contract the recess.

In one embodiment of the present invention, the adjusting means applies a corresponding force to the retaining means and the sealing means as the recess contracts. As a result, the retaining means and the sealing means are compressed and compelled to outwardly expand.

In another embodiment of the present invention, the retaining means is further composed of a tapered cone surrounding the controlling force means of the adjusting means. As the housing and the end piece contract, the expandable pins slide along the outer surface of the tapered cone causing the expandable pins to outwardly expand.

In yet another embodiment of the present invention, the sealing means is composed of an inflatable rubber bladder. The retaining means is composed of a plurality of grit type particles. The grit type particles of the retaining means are located within a recess of the sealing means. As the air valve pressurizes the inner chamber of the body, the rubber bladder is forced to inflate and expand outward.

This outward expansion causes the piercing edges, the expandable pins or the grit type particles of the retaining means to engage with the inside surface of the pipe fitting hub and also causes the sealing means to conform to the inner wall of the pipe fitting hub to provide a fluidtight seal.

The present invention is primarily designed for use in plumbing systems constructed of non-threaded pipes and fittings such as ABS, PVC, polypropylene and the like. In addition, the present invention can be modified to plug a pipe itself, rather than a pipe fitting hub. The plug must be therefore sized accordingly in order to fit the dimensions of the pipe.

The present invention is also designed to fit conventional sized piping, namely 1.5, 2, 3, and 4 inch piping, however, any size of piping can be plugged by the present invention.

Suitably, the housing can extend in an axial direction outward from the body such that the overall shape of the plug is cylindrical and allow the plug to be inserted a depth into the pipe or pipe fitting hub and to extend a distance out from the end of the pipe or pipe fitting hub.

These and other aspects of the present invention may be more fully understood by reference to the following drawings and description which are intended for illustrative purposes only.

BRIEF DESCRIPTION OF THE DRAWINGS

FIGS. 2a–2c are an installed view of a pipe fitting plug according to one of the embodiments of the present invention;

DETAILED DESCRIPTION OF THE INVENTION

Figure 1:
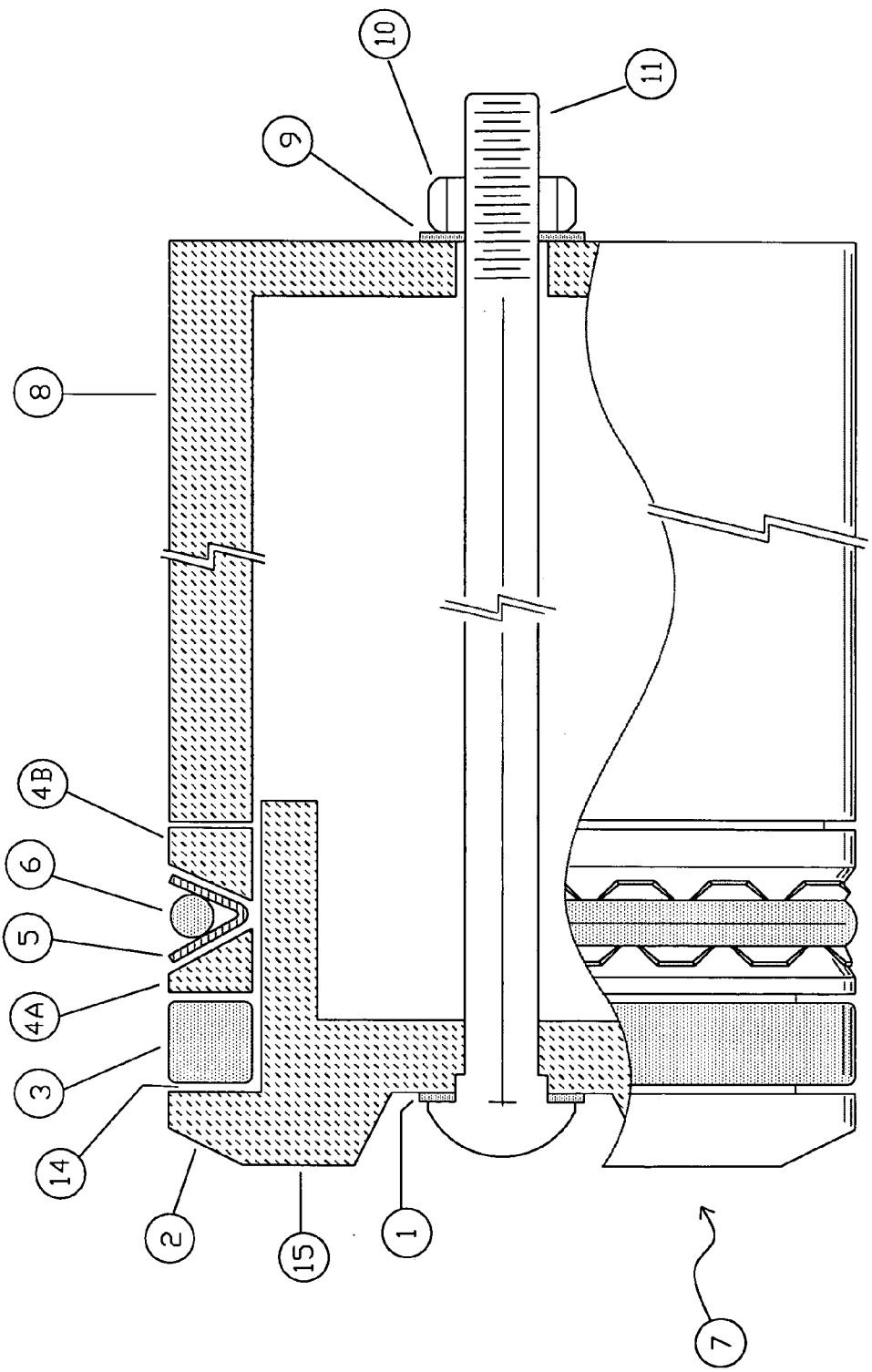
FIG. 1 is a sectional view of one of the embodiments of the pipe fitting plug of the present invention.

FIG. 1 illustrates a preferred embodiment of the present invention.

As shown in FIG. 1, pipe fitting plug 7 is composed of body 15, end piece 2 and cylindrical housing 8. End piece 2 is affixed around the outer circumference of body 15 so that the majority of body 15 can be encompassed by housing 8. Such an arrangement enables housing 8 to horizontally slide along a surface of body 15 and abut end piece 2.

Housing 8 is guided by controlling force means 11 as housing 8 moves along a surface of body 15. Controlling force means 11 protrudes through the center of body 15, end piece 2 and housing 8 and provides a means by which housing 8 and end piece 2 can be tightened together using hex nut 10. Rubber washer 1 provides a leak-proof seal around the head of controlling force means 11 as controlling force means 11 passes through end piece 2. Controlling force means 11 can be any threaded fastener or a carriage bolt as illustrated in FIG. 1.

FIG. 1 illustrates the positioning of recess 14 in which the sealing means and retaining means are preferably located. The sealing means and retaining means are preferably sized so as to be substantially the same size as recess 14.

The retaining means is comprised of front and rear push rings 4a and 4b, retaining ring 5 and O-ring 6.

Front push ring 4a and rear push ring 4b have inner angled surfaces designed to mate with an angled surface of retaining ring 5. These angled surfaces work in conjunction to cause retaining ring 5 to protrude towards and anchor into the inside wall of a pipe fitting hub that is desired to be plugged.

FIGS. 1 and 2 illustrate a preferred arrangement of retaining ring 5, front push ring 4a and rear push ring 4b. The angled surfaces of front push ring 4a and rear push ring 4b serve to wedge beneath or to pinch under retaining ring 5 in order to cause retaining ring 5 to travel away from the center axis of pipe fitting plug 7 and toward pipe fitting hub 12, see FIG. 2a. However, it should be understood that any particular arrangement of front push ring 4a, rear push ring 4b and retaining ring 5 can be utilized in order to achieve the object of the present invention.

The sealing means comprises end piece 2, rubber sealing element 3 and ring 4a. When end piece 2 and ring 4a compress element 3, element 3 expands to provide a watertight seal between pipe fitting plug 7 and the inside of the pipe fitting hub. Preferably, sealing element 3 is composed of a rubber material capable of expansion upon the exercise of a squeezing force in the direction of the axis of the pipe fitting plug. Rubber sealing element 3 is also preferably formed of a material capable of conforming to the inner wall of a pipe fitting hub 12.

Figure 3A:
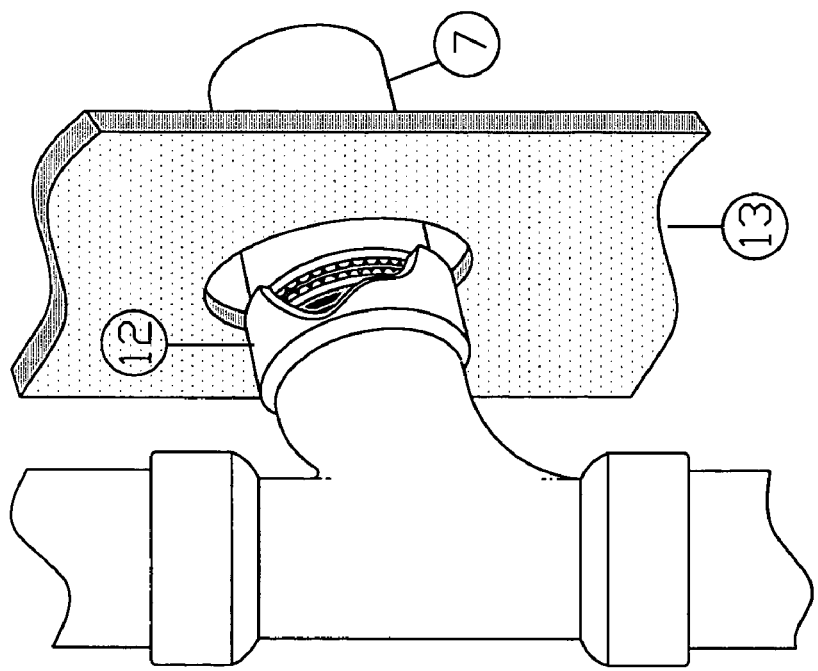
FIG. 3a is a pre-installation view of one of the embodiments of the present invention.

FIGS. 2a, 2c and 3a illustrate the operation the pipe fitting plug according to a preferred embodiment of the present invention.

Pipe fitting plug 7 is first inserted into pipe fitting hub 12 at a point of pipe fitting hub 12 that is intended to be plugged.

Once the pipe fitting plug is in position, a user manually tightens hex nut 10 mounted around controlling force means 11, while nylon washer 9 serves as a bearing surface for hex nut 10. This tightening movement causes a force to be exerted upon housing 8, and housing 8 correspondingly moves along body 15 toward end piece 2. The recess 14 between housing 8 and end piece 2 therefore decreases, because end piece 2 remains in a fixed position relative to the movement of housing 8.

As recess 14 contracts and decreases in width, sealing element 3, front push ring 4a, rear push ring 4b, retaining ring 5 and O-ring 6 are compressed together.

As shown in FIG. 2c, the angled surfaces of front push ring 4a and rear push ring 4b wedge beneath retaining ring 5 and cause retaining ring 5 to be outwardly extend toward the inner surface of pipe fitting hub 12. O-ring 6 is provided within retaining ring 5 in order to ensure that retaining ring 5 does not collapse as retaining ring 5 is compressed and allows for expansion of piercing edges of retaining ring 5 to retract from engagement with the inside of pipe fitting hub 12.

Figure 4A:
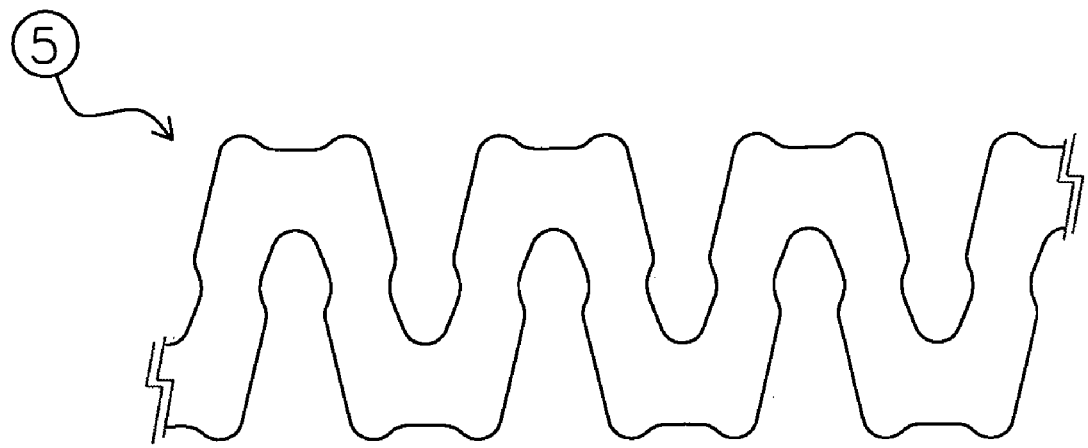
FIGS. 4a–4b illustrate a top view and a side view, respectively, of the movable piercing edges of the retaining means according to one embodiment of the present invention.
Figure 4B:
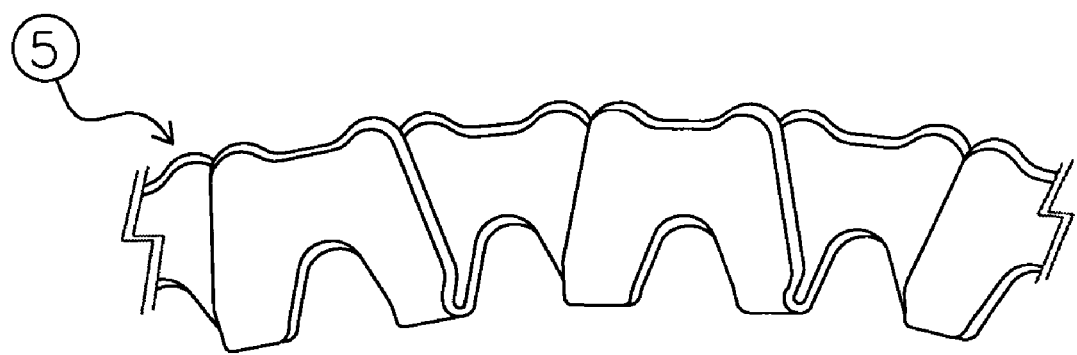

As retaining ring 5 outwardly expands, serrated piercing edges located on the upper surface of retaining ring 5 pierce into pipe fitting hub 12. Once the piercing edges are firmly engaged into pipe fitting hub 12, pipe fitting plug 7 is capable of withstanding increased fluid pressures without failure. FIGS. 4a–4b illustrate the configuration of the serrated piercing edges of the retaining means.

Further, sealing element 3 is also caused to expand due to the force applied from front push ring 4a and end piece 2. As depicted in FIG. 2c, a portion of sealing element 3 protrudes and conforms to the inner surface of pipe fitting hub 12 in order to form a fluidtight seal.

Preferably, retaining ring 5 of the present invention is designed in a "V" shape with serrated or jagged outer edges as shown in FIGS. 4a and 4b. This "V" shape allows for a sliding along the angled edges of the front and rear push rings as the front and rear push rings are contracted. However, it should be understood that any particular shape of the retaining ring, front push ring and rear push ring can be utilized so as to achieve the object of the present invention.

In order to disengage pipe fitting plug 7 from pipe fitting hub 12, nut 10 is unscrewed thereby releasing pressure from both sealing element 3 and retaining ring 5. Sealing element 3 disengages the inside of the pipe fitting hub and returns to its original shape. Retaining ring 5 disengages the inside of the pipe fitting hub and returns to its original shape because of O-ring 6.

Figure 3B:
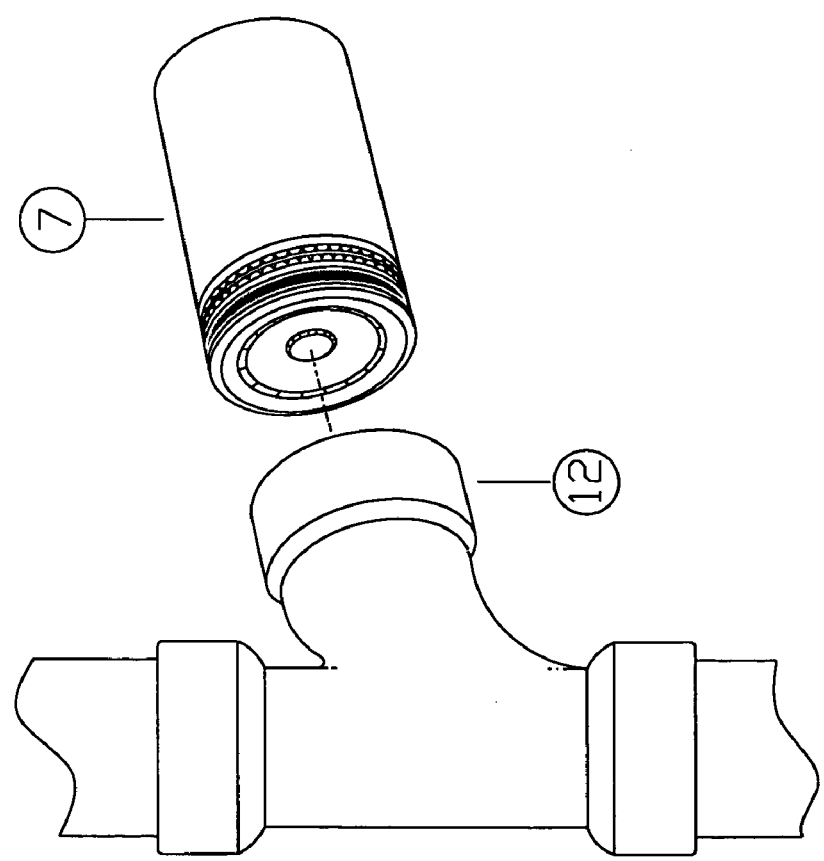
FIG. 3b is an installed view of a pipe fitting plug according to one of the embodiments of the present invention.

The pipe fitting plug according to the present invention is also capable of extending to reach and plug a portion of a pipe fitting hub that could not ordinarily be reached through conventional means. Housing 8 and controlling force means 11 can be indefinitely extended in order to easily plug a section of a pipe fitting hub from a distance as shown in FIGS. 3a and 3b.

Figure 5:
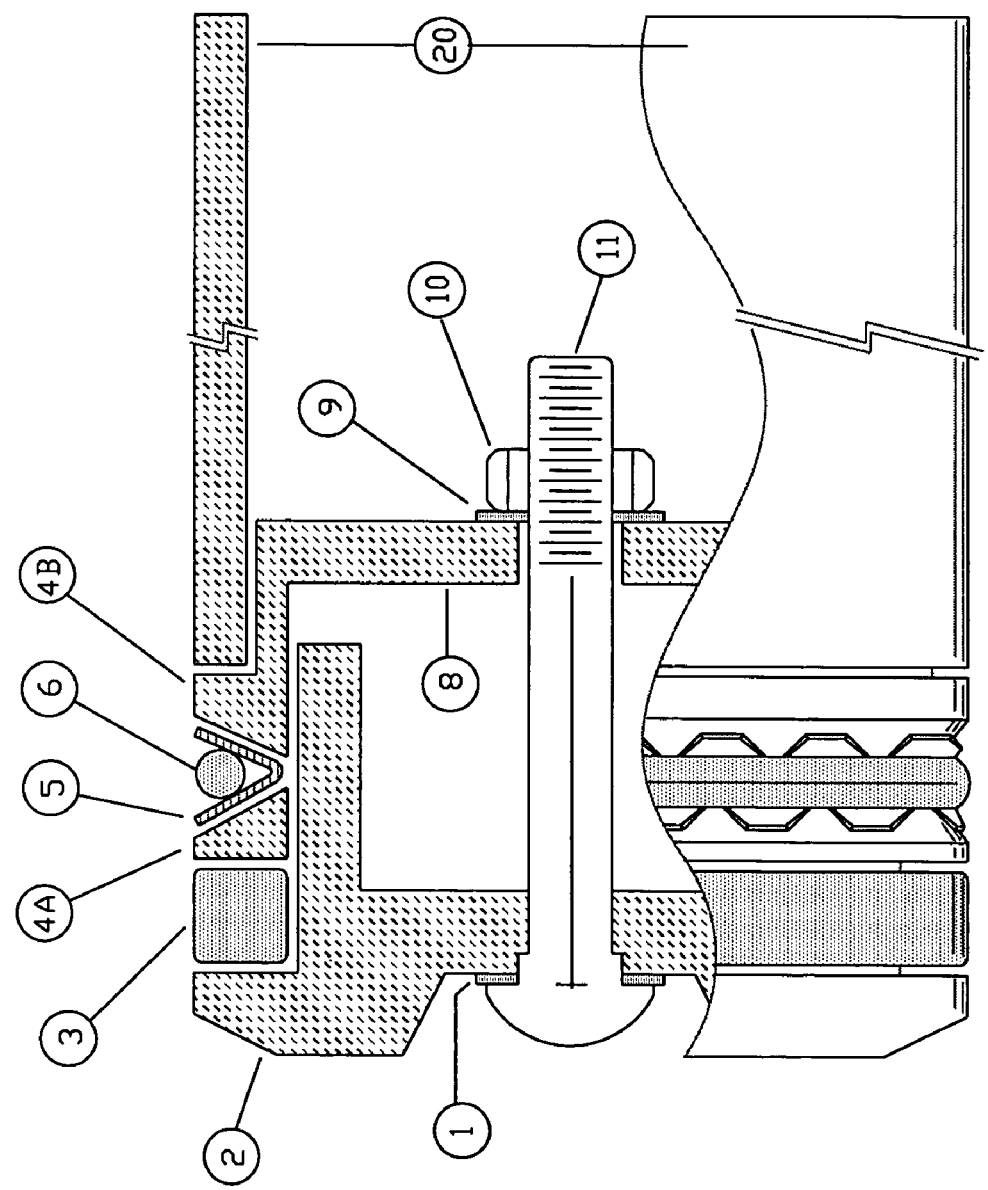
FIG. 5 illustrates an alternative embodiment of the present invention.

FIG. 5 illustrates another embodiment of the present invention wherein housing 8 forms part of ring 4b. Extension 20 is attached to housing 8.

Figure 6:
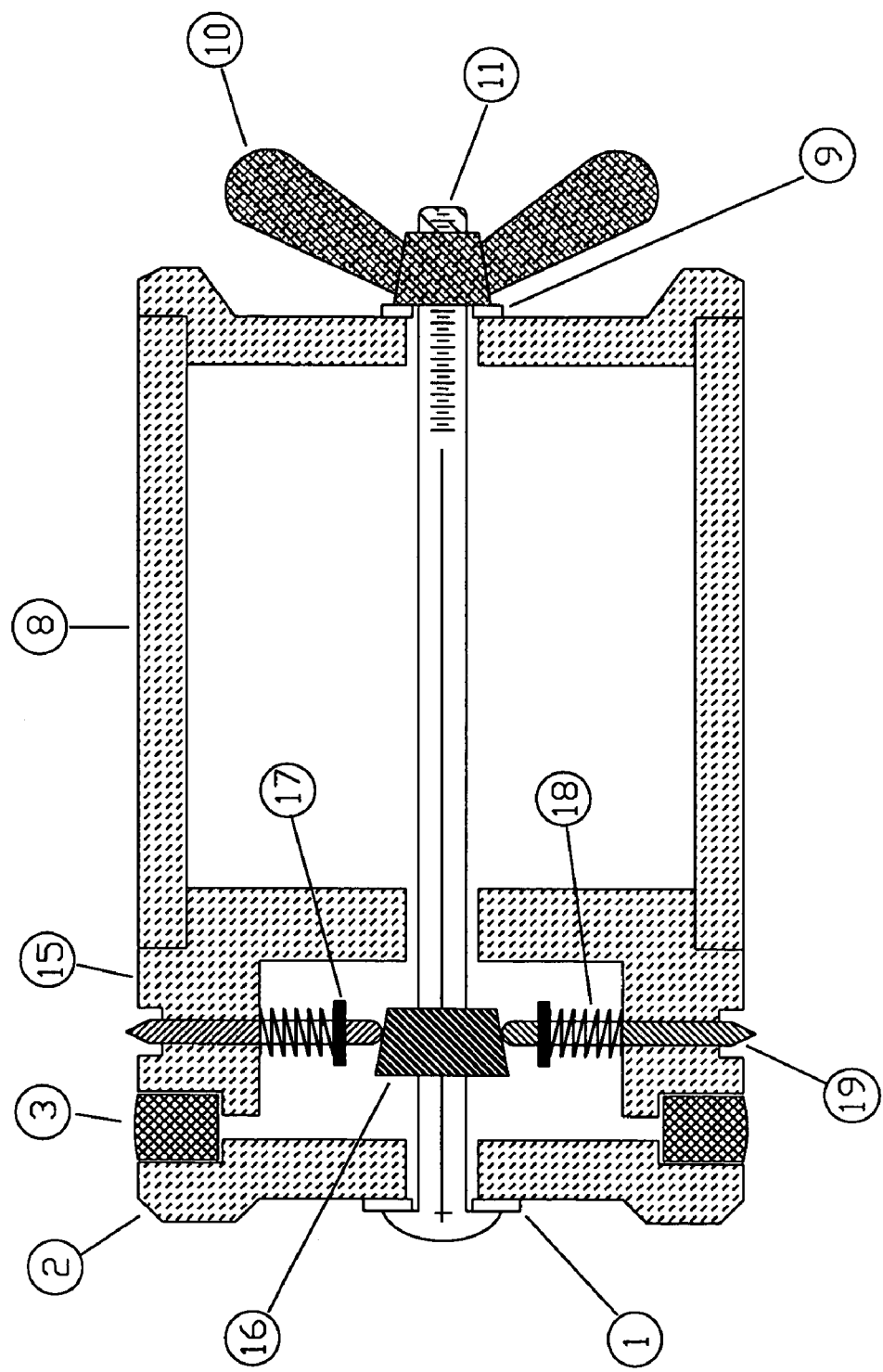
FIG. 6 illustrates a sectional view of an alternative embodiment of the present invention.

FIG. 6 illustrates another preferred embodiment of the present invention where the retaining means contains one or more expandable pins 19 which extend perpendicular to the longitudinal axis of the pipe fitting plug.

As shown in FIG. 6, housing 8 slides along body 15 and is capable of compressing body 15 against end piece 2. Controlling force means 11 protrudes through body 15, end piece 2 and housing 8 and enables body 15, end piece 2 and housing 8 to be compressed together using wing nut 10.

The retaining means is composed of one or more expandable pins 19, tapered cone 16, clips 17 and spring 18. Wing nut 10 and controlling force means 11 are capable of compressing housing 8 thereby pushing body 15 toward end piece 2. As body 15 is pushed toward end piece 2, expandable pins 19 slide along the outer surface of tapered cone 16 and thereby extend outward toward the inner wall of the pipe fitting hub. As a result, the pipe fitting plug is securely anchored into the pipe fitting hub.

The retaining means according to this embodiment also contains clips 17 and springs 18. Springs 18 help to retract expanding pins 19 when the plug is not compressed. Clips 17 allow for springs 18 and expanding pins 19 to be mounted to the pipe fitting plug in a firm position.

FIG. 6 also illustrates the positioning of sealing means 3. Sealing means 3 is located in a recess formed between end piece 2 and body 15. As end piece 2 and body 15 are compressed together, the recess formed between end piece 2 and body 15 contracts, and sealing means 3 is compelled to outwardly expand. This outward expansion allows for sealing means 3 to form a fluidtight seal between the pipe fitting plug and the pipe fitting hub. Preferably, the sealing means is composed of a rubber-like material that is durable as well as expandable.

In order to disengage the pipe fitting plug from the inner wall of the pipe fitting hub, wing nut 10 is rotated in the opposite direction to allow for housing 8 to decompress body 15 and end piece 2. As wing nut 10 is loosened, sealing means 3 breaks contact with the inner wall of the pipe fitting hub and expandable pins 19 withdraw from the inner surface of the pipe fitting hub. Thus, the pipe fitting plug can be removed from within the pipe fitting hub and can be reused.

Figure 7:
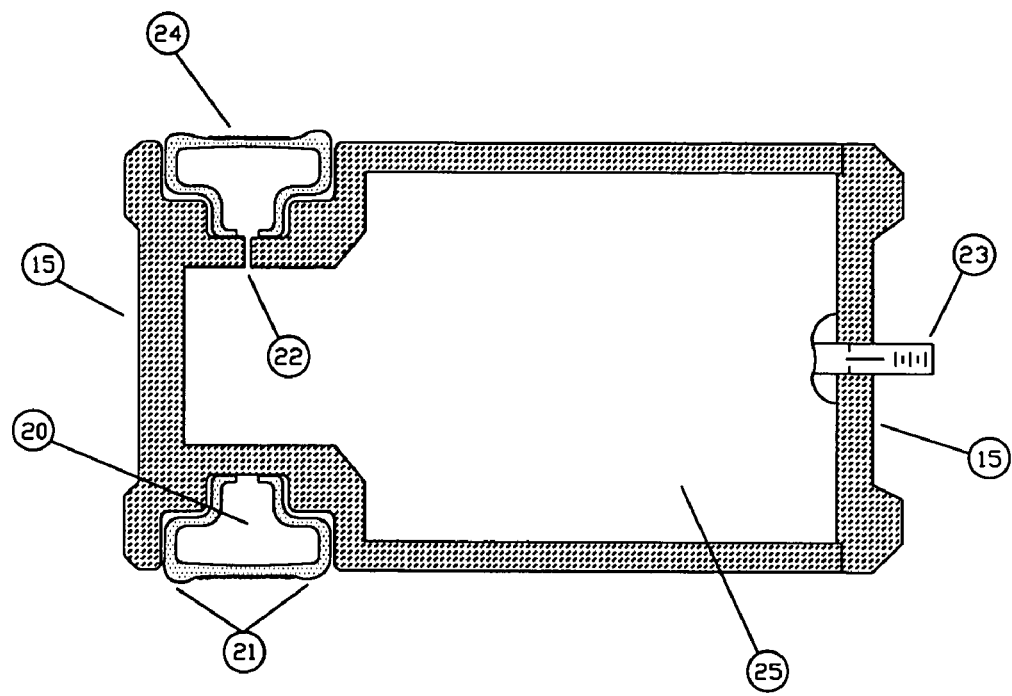
FIG. 7 illustrates a sectional view of an alternative embodiment of the present invention.

FIG. 7 illustrates yet another preferred embodiment of the present invention where the pipe fitting plug is secured to the pipe fitting hub using a plurality of grit type particles 24 while a fluidtight seal is formed using expandable rubber bladder 20.

Figure 8:
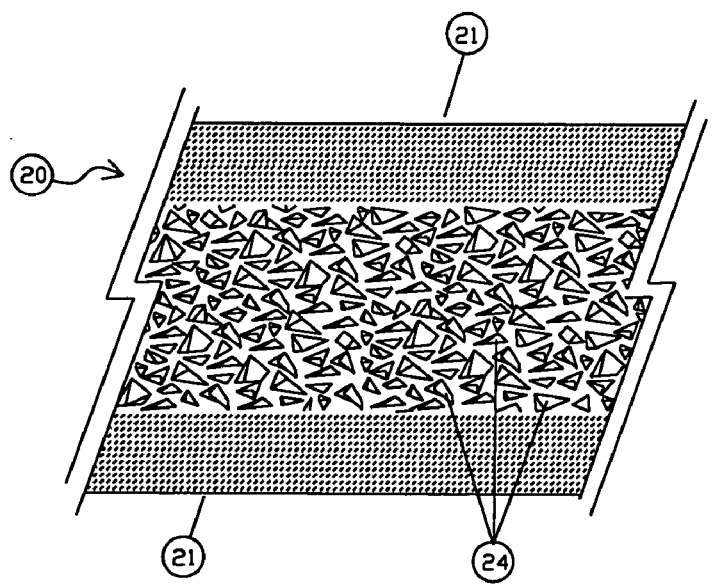
FIG. 8 illustrates a top view of the grit type particles of the present invention.

As shown in FIG. 7, expandable rubber bladder 20 is located within a recess of body 15 of the pipe fitting plug. Expandable rubber bladder 20 contains raised outer seal area 21 which allows for expandable rubber bladder 20 to form a fluidtight seal between the pipe fitting plug and the pipe fitting hub. Furthermore, a plurality of grit type particles 24 attach to the inner surface of the expandable rubber bladder, within outer seal area 21. The plurality of grit type particles 24 serve to affix the pipe fitting plug to the pipe fitting hub to provide a secure attachment. The plurality of grit type particles located between outer seal area 21 of expandable rubber bladder 20 are illustrated in FIG. 8.

FIG. 7 also illustrates the operation of the adjusting means that allows for the sealing means and the retaining means to expand and contract.

The adjusting means according to this embodiment is composed of air valve 23, inner chamber 25 of body 15 and air ports 22. Air valve 23 is in communication with inner chamber 25, which is in turn in communication with expandable rubber bladder 20 via air ports 22.

Air valve 23 is capable of increasing the air pressure within inner chamber 25. As the pressure within inner chamber 25 increases, so does the pressure within expandable rubber bladder 20. Thus, air valve 23 is capable of inflating and deflating expandable rubber bladder 20 through the increase or decrease of air pressure within inner chamber 25. As expandable rubber bladder 20 inflates, a fluidtight seal is formed between the outer seal area 21 of expandable rubber bladder 20 and the pipe fitting hub.

As expandable rubber bladder 20 approaches the inner wall of the pipe fitting hub, plurality of grit type particles 24 impregnated within the perimeter outer seal area 21 of expandable rubber bladder 20 affix to the inner wall of the pipe fitting hub. Thus, plurality of grit type particles 24 allow for the pipe fitting plug to be retained in the pipe fitting hub.

As air pressure is decreased from within inner chamber 25, expandable rubber bladder 20 deflates, outer seal area 21 and the plurality of grit type particles 24 break contact with the inner wall of the pipe fitting hub and the pipe fitting plug can be disengaged from the pipe fitting hub. The pipe fitting plug can thus be reused.

It will be understood that the claims are intended to cover all changes and modifications of the preferred embodiments of the invention herein chosen for the purpose of illustration which do not constitute a departure from the spirit and scope of the invention.

What is claimed is:

1. A pipe fitting plug comprising:
a body which is watertight;
an expandable sealing means surrounding said body for forming a watertight seal between said body and an interior surface of a plastic pipe fitting hub;
an expandable retaining means for engaging said interior surface of said pipe fitting hub and retaining said plug in said pipe fitting hub; and
one or more adjusting means for causing said sealing means and said retaining means to engage and disengage said interior surface of said pipe fitting hub,
wherein said retaining means comprises two blade portions, each of said blade portions having a blade thickness that is substantially smaller than the blade length so that the blade portions pierce said interior surface of said pipe fitting hub when said retaining means engages said interior surface of said pipe fitting hub.

2. The pipe fitting plug of claim 1 wherein said sealing means comprises:
an expandable rubber seal; and
two surfaces which compress said expandable rubber seal causing said expandable rubber seal to expand.

3. The pipe fitting plug of claim 1 wherein said retaining means comprises:
a wedging means comprising angled surfaces capable of extending said retaining ring; and
an O-ring positioned within said wedging means.

4. The pipe fitting plug of claim 1 wherein there is one said adjusting means which operates on both said retaining means and said sealing means such that both said retaining means and said sealing means expand simultaneously and contract simultaneously.

5. The pipe fitting plug of claim 1 wherein said retaining means and said sealing means are located within a recess of said body and wherein said recess is created between an end piece of said body and a housing which surrounds said body.

6. A pipe fitting plug comprising:
(a) a body comprising an end piece at one end of said body;
(b) a housing surrounding said body at the other end of said body;
(c) an expandable sealing means surrounding said body and positioned between said end piece and said housing; and
(d) an expandable retaining means, said retaining means positioned adjacent said sealing means and between said end piece and said housing,
wherein said end piece and said housing are capable of exerting a force against said sealing means in order to expand said sealing means to form a seal between said sealing means and an inside of a plastic pipe fitting hub,
wherein said end piece and said housing are capable of exerting a force against said retaining means in order to engage said retaining means with said inside of plastic pipe fitting hub,
wherein said retaining means comprises two blade portions, each of said blade portions having a blade thickness that is substantially smaller than a blade length so that the blade portions pierce said inside of said pipe fitting hub when retaining means engages said inside of said pipe fitting hub.

7. The pipe fitting plug of claim 6 wherein said sealing means comprises:
an expandable rubber seal; and
two surfaces which compress said expandable rubber seal causing said expandable rubber seal to expand.

8. The pipe fitting plug of claim 6, wherein said retaining means comprises:
a wedging means comprising angled surfaces capable of extending said retaining means; and
an O-ring, wherein said two blade portions are connected so as to form a "V"-shape and said O-ring is positioned within said "V"-shape.

9. The pipe fitting plug of claim 8, wherein said wedging means comprises two rings having a flat edge on one side and a beveled edge on an opposing side.

10. The pipe fitting plug of claim 6, wherein a controlling force means is affixed to said body and protrudes through said housing and said end piece, and a fastener attaches to said controlling force means and is capable of exerting a force against said housing.

11. A method for sealing the open fitting hub of a pipe comprising:
(a) inserting a pipe fitting plug into a pipe fitting hub, wherein said pipe fitting plug comprises:
a body which is watertight;
a sealing means surrounding said body for forming a watertight seal between said body and an interior surface of a plastic pipe fitting hub;
an expandable retaining means for engaging said interior surface of said plastic pipe fitting hub and retaining said plug in said plastic pipe fitting hub; and
one or more adjusting means for causing said sealing means and said retaining means to engage and disengage with said interior surface of said plastic pipe fitting hub,
wherein said retaining means comprises two blade portions, each of said blade portions having a blade thickness that is substantially smaller than the blade length so that the blade portions pierce said interior surface of said pipe fitting hub when said retaining means engages said interior surface of said pipe fitting hub; and
(b) adjusting said adjusting means to cause said sealing means to form a watertight seal and said retaining means to engage said interior of said plastic pipe fitting hub.

* * * * *